United States Patent
Wang et al.

(10) Patent No.: US 9,571,392 B2
(45) Date of Patent: Feb. 14, 2017

(54) FORWARDING PACKETS

(71) Applicant: Hangzhou H3C Technologies Co., Ltd., Hangzhou (CN)

(72) Inventors: Minghui Wang, Beijing (CN); Zhenglin Qi, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/758,462

(22) PCT Filed: Mar. 25, 2014

(86) PCT No.: PCT/CN2014/073999
§ 371 (c)(1),
(2) Date: Jun. 29, 2015

(87) PCT Pub. No.: WO2014/154123
PCT Pub. Date: Oct. 2, 2014

(65) Prior Publication Data
US 2016/0065463 A1    Mar. 3, 2016

(30) Foreign Application Priority Data

Mar. 25, 2013   (CN) ........................ 2013 1 0098945

(51) Int. Cl.
*H04L 12/721*    (2013.01)
*H04L 12/931*    (2013.01)
(Continued)

(52) U.S. Cl.
CPC ............ *H04L 45/72* (2013.01); *H04L 45/021* (2013.01); *H04L 45/66* (2013.01); *H04L 45/745* (2013.01); *H04L 49/351* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 5,856,974 A | 1/1999 | Gervais et al. | |
| 2003/0108055 A1* | 6/2003 | Damon | H04L 29/12009 370/401 |

(Continued)

FOREIGN PATENT DOCUMENTS

| | | |
|---|---|---|
| CN | 101114971 | 1/2008 |
| CN | 101729420 | 6/2010 |

(Continued)

OTHER PUBLICATIONS

International Search Report and Written Opinion dated Jul. 1, 2014 issued on PCT Patent Application No. PCT/CN2014/073999 dated Mar. 25, 2014, The State Intellectual Property Office, P.R. China.

(Continued)

*Primary Examiner* — Christine Duong
(74) *Attorney, Agent, or Firm* — Hewlett Packard Enterprise Patent Department

(57) ABSTRACT

Based on an example, a core backbone (CB) device receives via a second-level stacking port connected with a source port extender (PE) device, a packet containing a source port number and a local identifier of a source forwarding chip. The CB device transmits the packet via a second-level stacking port connected with a destination PE device, wherein the packet contains the source port number, a global identifier of the source forwarding chip, a local identifier of a destination forwarding chip and a destination port number.

12 Claims, 5 Drawing Sheets

(51) Int. Cl.
  *H04L 12/755* (2013.01)
  *H04L 12/741* (2013.01)

(56) References Cited

U.S. PATENT DOCUMENTS

| | | | | |
|---|---|---|---|---|
| 2008/0049752 A1* | 2/2008 | Grant | ................. | H04L 12/4641 370/392 |
| 2010/0054117 A1* | 3/2010 | Southworth | ........ | H04L 49/3009 370/216 |
| 2014/0050217 A1* | 2/2014 | Janakiraman | ........... | H04L 49/10 370/389 |

FOREIGN PATENT DOCUMENTS

| | | |
|---|---|---|
| CN | 102946356 | 2/2013 |
| CN | 103166874 | 6/2013 |

OTHER PUBLICATIONS

CN First Office Action dated Jul. 22, 2015, CN Patent Application No. 201310098945.7 dated Mar. 25, 2013, State Intellectual Property Office of the P.R. China.
Extended European Search Report, EP Application No. 14772853.9, Date: Oct. 27, 2016, pp. 1-7, EPO.

* cited by examiner

FORWARDING PACKETS

CLAIM FOR PRIORITY

The present application is a national stage filing under 35 U.S.C. §371 of PCT application number PCT/CN2014/073999, having an international filing date of Mar. 25, 2014, which claims priority to Chinese patent application number 201310098945.7, having a filing date of Mar. 25, 2013, the disclosures of which are hereby incorporated by reference in their entireties.

BACKGROUND

In order to meet requirement of a data center, a stacking system consists of a core backbone (CB)-port extender (PE) is proposed. In the stacking system, CB devices are connected with each other in a ring or in a chain via stacking links. A PE device is connected with a CB device via a stacking link. PE devices are not connected with each other.

In the stacking system, the PE device provides a port extension function for the CB device. The CB device learns a forwarding table entry based on a source address (e.g., learns the forwarding table entry based on a media access control (MAC) address), searches for a forwarding table entry matching a destination address, and determines an identifier of a destination forwarding chip and a destination port for forwarding a packet.

In the whole stacking system, different global identifiers are assigned to forwarding chips of the CB devices and the PE devices. If the identifier of the destination forwarding chip corresponds to a forwarding chip of the PE device, the CB device transmits a packet containing the identifier of the destination forwarding chip and a destination port number to the PE device. The PE device forwards the packet via the corresponding forwarding chip and destination port number.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure is described in further detail with reference to the accompanying drawings and examples. For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
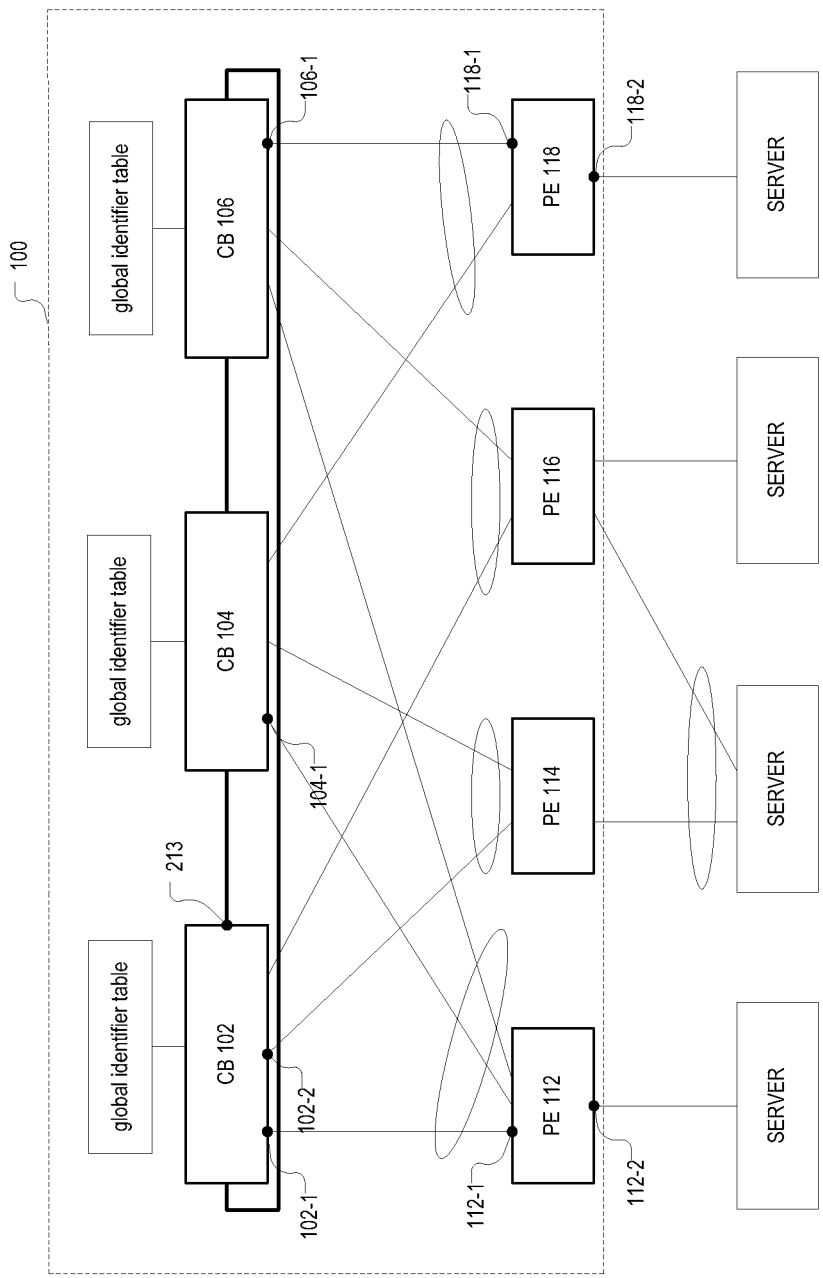
FIG. 1 is a schematic diagram illustrating a stacking system based on an example of the present disclosure.

FIG. 1 shows a stacking system 100 which includes CB devices 102, 104, 106 and PE devices 112, 114, 116, 118. The CB devices 102, 104, 106 are connected in a ring or a chain via stacking links. The PE devices 112, 114, 116, 118 are respectively connected with one or more CB devices via stacking links. Each of the CB and PE devices includes one or more forwarding chips. One of the CB devices 102, 104, 106 is designated or selected as a master device. The master device may assign a global unit ID for each forwarding chip of the CB devices and may assign a local unit ID and a global unit ID for each forwarding chip of the PE devices.

Figure 2:
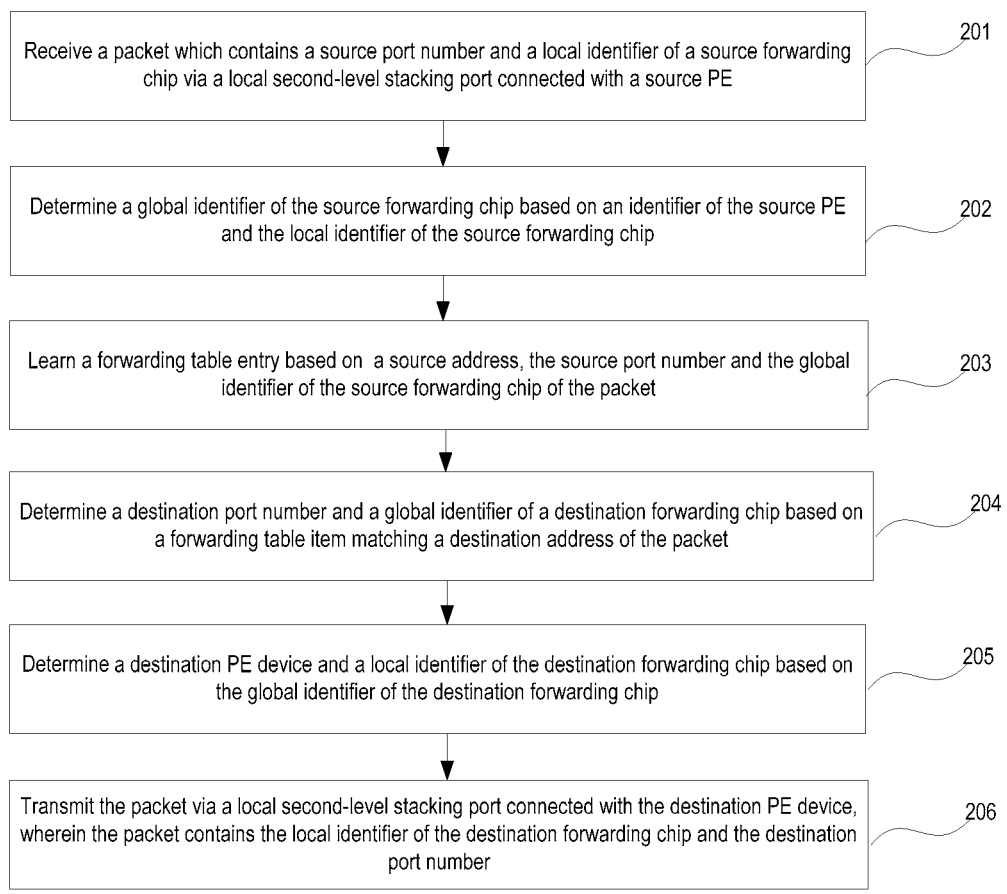
FIG. 2 is a flowchart illustrating a method for forwarding a packet based on an example of the present disclosure.

As shown in FIG. 2, a method for forwarding a packet in the stacking system provided by an example of the present disclosure includes the following.

At block 201, a packet which contains a source port number and a local identifier of a source forwarding chip is received via a local second-level stacking port connected with a source PE.

The packet may for instance have been sent by a PE (the 'source PE') and received by a CB via a local second-level stacking port of the CB. As an example, with reference to FIG. 1, the packet may have been sent by PE 112 and received by CB 102 via its second-level stacking port 102-1. In another example the packet may have been sent by PE 112 and received by CB 104 via a second-level stacking port 104-1 of CB 104. In another example the packet may have been sent by PE 114 (in which case PE 114 is the 'source PE') and received by a second-level stacking port 102-2 of the CB 102 etc.

At block 202, a global identifier of the source forwarding chip is determined based on an identifier of the source PE and the local identifier of the source forwarding chip.

At block 203, a forwarding table entry is learnt based on a source address, the source port number and the global identifier of the source forwarding chip of the packet.

At block 204, a destination port number and a global identifier of a destination forwarding chip are determined based on a forwarding table entry matching a destination address of the packet.

At block 205, a destination PE device and a local identifier of the destination forwarding chip are determined based on the global identifier of the destination forwarding chip.

At block 206, the packet is transmitted via a local second-level stacking port connected with the destination PE device, wherein the packet contains the local identifier of the destination forwarding chip and the destination port number.

The method as shown in FIG. 2 may be applied to a CB device in the stacking system. The CB device learns the forwarding table entry and searches for a matching forwarding table entry based on the global identifier of the source forwarding chip. The CB device replaces the global identifier of the destination forwarding chip in the packet to be forwarded to the PE device via the stacking port by the local identifier of the forwarding chip which can be recognized by the PE device. In this way, even if the total number of forwarding chips in the stacking system exceeds a recognizing capability of the PE device, the PE device is still able to forward packets. As long as the total number of global identifiers of the forwarding chips in the stacking system is within a recognizing capability of the CB, the CB device can replace the local identifier from the PE with a global identifier. In this way, more PE devices (each with one or more forwarding chips) may be included in the stacking system. The source port number or the destination port number may be a number, letter, series of letters or any other code which identifies one port.

Referring again to FIG. 1, the stacking system 100 includes CB devices 102~106 and PE devices 112~118. The CB devices 102~106 are respectively configured with a stack port connected with the PE devices 112~118. The PE devices 112~118 are respectively connected with the stack ports of the CB devices 102~106 via stacking links. CB devices 102~106 are connected in a ring via stacking links. In order to differentiate the stacking ports of the CB devices 102~106, in this example, the ports (e.g., port 113 in FIG. 2) which connect the CB devices 102~106 are referred to as first-level stacking ports. The ports (e.g., ports 102-1 and 106-1 in FIG. 2) which connect the CB devices 102~106 with the PE devices 112~118 are referred to as second-level stacking ports.

Three uplink ports of the PE device 112 are respectively connected with one second-level stacking port of the CB devices 102, 104 and 106. The PE device 112 binds the three uplink ports into a link aggregation group (LAG). The PE devices 112~118 respectively binds their uplink ports connected with the CB devices into one LAG. A plurality of uplink ports of each PE device may be connected with several second-level stacking ports of the same CB device.

In FIG. 1, the CB devices 102~106 may elect the CB device 102 as the master device based on a preconfigured electing scheme.

The master CB device, 102 for example, assigns a global unit ID for each forwarding chip of the CB devices 102~106 and assigns a local unit ID and a global unit ID for each forwarding chip of the PE devices 112~118.

The global unit ID is a global identifier which uniquely identifies a forwarding chip in the stacking system. The range of the global unit ID is associated with the number of forwarding chips that the CB devices 102~106 support. If each of the CB devices 102~106 may support 256 forwarding chips, there may be 256 global unit IDs and the range may be [0, 255].

The local unit ID uniquely identifies each forwarding chip within one PE device. The range of the local unit ID is associated with the number of forwarding chips that each of the PE devices 112~118 supports. If each of the PE devices 112~118 supports 64 forwarding chips, there may be 64 local unit IDs and the range may be [0, 63].

The local unit IDs assigned to the same PE device are not repeated. The local unit IDs assigned to forwarding chips in different PE devices may be repeated.

Suppose that the CB devices 102~106 respectively have 4 forwarding chips. The PE devices 112~118 respectively have 2 forwarding chips. The CB device 102 assigns global unit ID 0~global unit ID 11 to the forwarding chips of the CB devices 102~106 and assigns global unit ID 129~global unit ID 136 to the forwarding chips of the PE devices 112~118. The global unit IDs of the forwarding chips of the PE devices 112~118 are within the range [12, 255], and different with the global unit IDs of the CB devices.

The CB device 102 assigns local unit ID 0 and local unit ID 1 for the forwarding chips of the PE device 112, assigns local unit ID 0 and local unit ID 1 for the forwarding chips of the PE device 114, assigns local unit ID 0 and local unit ID 1 for the forwarding chips of the PE device 116, and assigns local unit ID 0 and local unit ID 1 for the forwarding chips of the PE device 118.

The CB device 102 records a global identifier table including a corresponding relationship between the local unit ID and the global unit ID of each forwarding chip of the PE devices 112~118 (as shown in table 1), and transmits the recorded corresponding relationship to the CB devices 104 and 106.

TABLE 1

| PE device | local unit ID | global unit ID |
|---|---|---|
| PE device 112 | 0 | 129 |
|  | 1 | 130 |
| PE device 114 | 0 | 131 |
|  | 1 | 132 |
| PE device 116 | 0 | 133 |
|  | 1 | 134 |
| PE device 118 | 0 | 135 |
|  | 1 | 136 |

Besides being assigned by the master device, the local unit IDs and the global unit IDs may also be configured manually. At this time, a corresponding relationship between the local unit ID and the global unit ID of each forwarding chip of the PE devices 112~118 is recorded in the CB devices 102~106.

Proxy ports are configured on the CB devices 102~106. The proxy port may be a virtual port. The proxy ports configured on the CB devices 102~106 have the same port attribute value. For example, the second-level stacking ports of the CB devices 102~106 may be configured as the proxy ports with the same port number. Herein, the port number of the proxy ports may be denoted by "proxy".

An access control list (ACL) or other packet redirection function may be configured on the PE devices 112~118, so as to redirect packets received via external ports (e.g., Ethernet ports) of the PE devices 112~118 to the proxy ports of the CB devices 102~106. The ACL rule of the PE devices 112~118 may include: if a receiving port via which a packet is received matches the external port of the PE device, a destination Mod and a destination Port in a HG header of the packet are replaced by the port number (proxy) of the proxy port of the CB device.

Thus, the PE devices 112~118 may redirect packets received via their external ports to the proxy ports of the CB devices 102~106. The CB devices 102~106 searches for a matching forwarding table entry and forward the packet to implement packet forwarding in the virtual system.

Besides redirection, the PE devices 112~118 also establish an association relationship between the Ethernet ports and the uplink ports. For example, the PE device 112 receives an Ethernet packet via port 112-2, encapsulates the Ethernet packet with a HG header and transmits the Ethernet packet encapsulated with the HG header via an uplink port 112-1 associated with the port 112-2.

Figure 3:
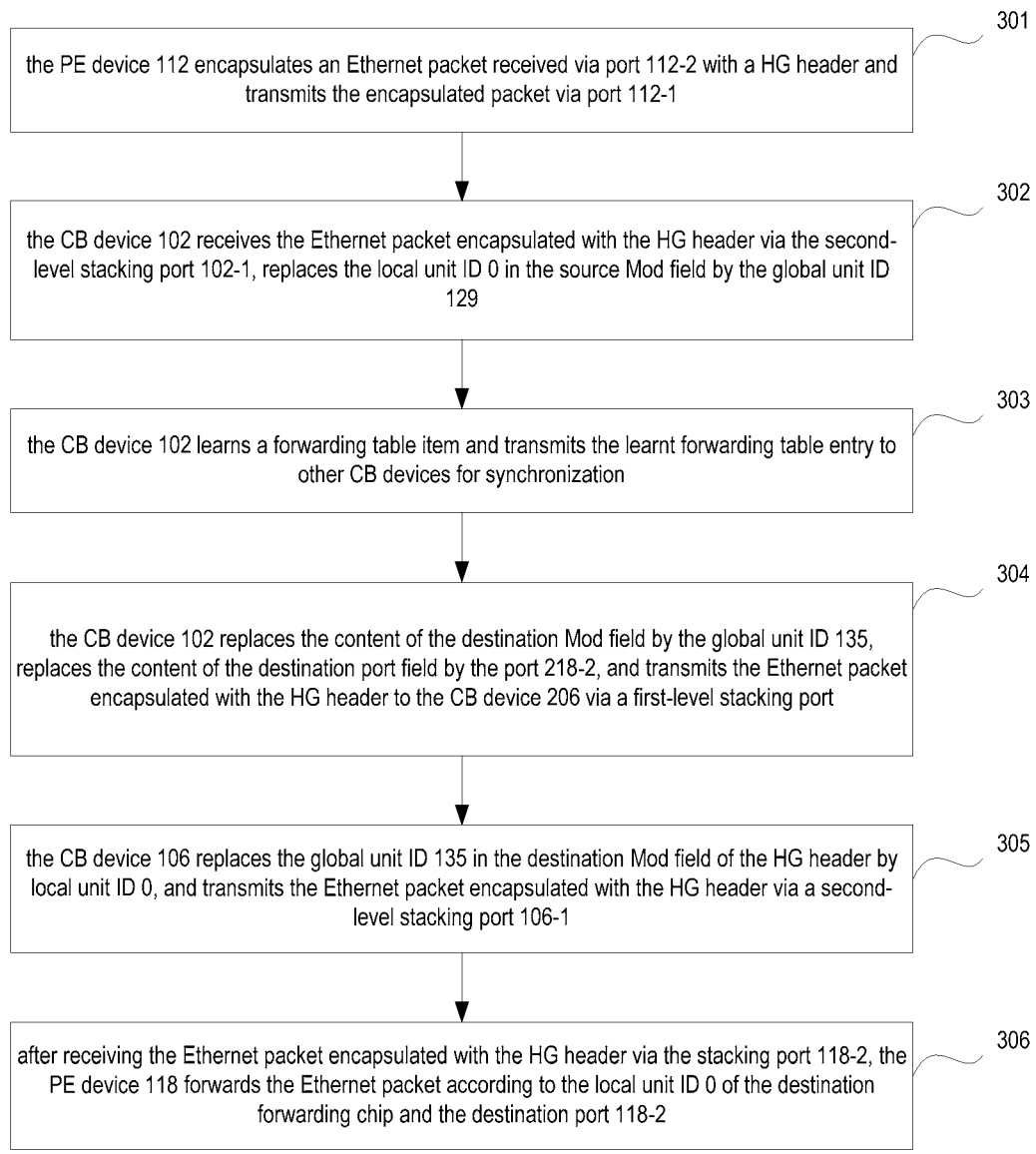
FIG. 3 is a flowchart illustrating a method for forwarding a packet in a stacking system based on an example of the present disclosure.

As shown in FIG. 3, a packet forwarding procedure in the stacking system 100 may be as follows.

At block 301, the PE device 112 encapsulates an Ethernet packet received via port 112-2 with a HG header and transmits the encapsulated packet via port 112-1.

Figure 4:
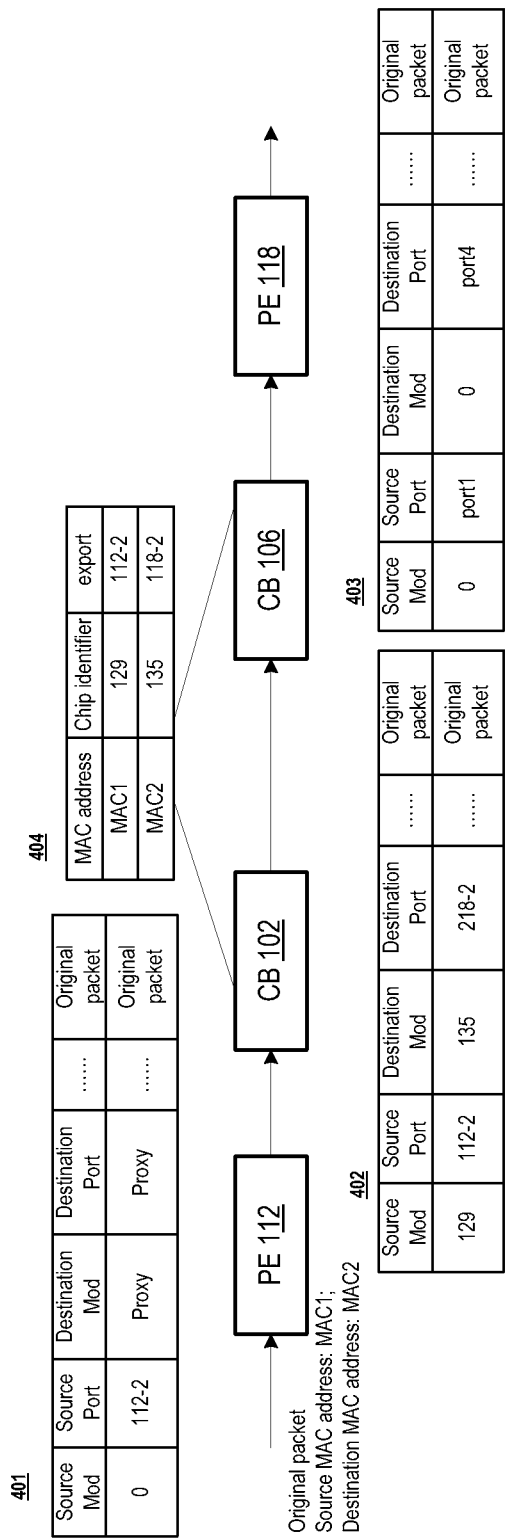
FIG. 4 is a schematic diagram illustrating replacement of an identifier of a forwarding chip based on an example of the present disclosure.

As shown in FIG. 4, a source MAC address of the Ethernet packet received by the PE device 112 via port 112-2 is MAC1 and a destination MAC address is MAC2. The PE device 112 encapsulates the Ethernet packet with a forwarding header, e.g., a HG header. Table 401 of FIG. 4 shows an example format of a data packet transmitted within the stacking system 100. The data packet comprises a forwarding header added to the original data packet. The forwarding header may include a source Port, a source Mod, a destination Mod, a destination Port and other information. In the example shown in FIG. 4, table 401 shows the contents of a data packet comprising an original packet received at the port 112-2 of the PE 112 and an HG header added by the PE 112. In the HG header, the source Port is port 112-2, the source Mod is local unit ID 0 of the forwarding chip where port 112-2 is located, the destination Mod and the destination Port are proxy.

The PE device 112 determines to forward the Ethernet packet encapsulated with the HG header via the LAG based on the destination Mod and the destination Port. Based on a hash algorithm configured in advance, a hash value is calculated. A member port (Port 112-1) matching the hash value in the LAG is selected for transmitting the encapsulated packet. The PE device 112 calculates the hash value based on the source MAC address and the destination MAC address, or based on a five-tuple or a seven tuple of the Ethernet packet.

At block 302, the CB device 102 receives the Ethernet packet encapsulated with the HG header via the second-level stacking port 102-1, replaces the local unit ID 0 in the source Mod field by the global unit ID 129.

The CB device 102 receives the Ethernet packet encapsulated with the HG header via the second-level stacking port 102-1, determines the global unit ID 129 based on the PE device 112 corresponding to the second-level stacking port 102-1 and the local unit ID 0 in the source Mod field, and replaces the local unit ID 0 in the source Mod field by the global unit ID 129.

In addition, if the global unit IDs of the forwarding chips of the PE devices are continuous and the local unit IDs of them are also continuous, it is possible to determine a parameter uniquely corresponding to each PE device based on a difference between the global unit ID and the local unit ID of the forwarding chip of the PE device. Each CB device may add the local unit ID with the parameter of the PE device to recognize the global unit ID. For example, the parameter 129 of the PE device 112 may be obtained based on the difference between the global unit ID and the local unit ID of the PE device 112. The CB device 102 adds the local unit ID 0 in the source Mod field with the parameter of the PE device 112 and obtains the global unit ID 129. The CB device may adopt other methods to replace the local unit ID in the source Mod field by the corresponding global unit ID. Those methods are not described herein.

At block 303, the CB device 102 learns a forwarding table entry and transmits the learnt forwarding table entry to other CB devices for synchronization.

The CB device 102 finds in a local forwarding table a MAC address table entry (see table 404 in FIG. 4) matching MAC1, updates an aging time of the found MAC address table entry. If the CB device 102 does not find a MAC address table entry matching MAC1, the CB device 102 learns the MAC address forwarding table entry based on MAC1, port 112-2 and the global unit ID 129.

The CB device 102 may transmit the MAC address table entry to the CB devices 104 and 106 for synchronization periodically. If each of the CB devices 102~106 is connected with the PE devices 112~118, the MAC address table synchronization procedure may be passed.

The CB devices 104 and 106 also transmit forwarding table entries learnt by them for synchronization periodically.

Thus, the CB devices 102~106 in the stacking system may have the same forwarding table entries (see table 404 shown in FIG. 4).

At block 304, the CB device 102 replaces the content of the destination Mod field by the global unit ID 135, replaces the content of the destination port field by the port 118-2, and transmits the Ethernet packet encapsulated with the HG header to the CB device 106 via a first-level stacking port.

The CB device 102 finds a MAC address table entry (see table 404 in FIG. 4) matching MAC2, replaces the content in the destination Mod field by the global unit ID 135 and replaces the content in the destination port field by port 118-2. The CB device 102 determines based on table 1 that the forwarding chip with the global unit ID 135 is located in the PE device 118. The CB device 102 determines based on network topology information saved in the CB device 102 that the CB devices 104 and 106 are connected with the PE device 118. The CB device 102 transmits the Ethernet packet encapsulated with the HG header via the first-level stacking port connected with the CB device 106, wherein the source Mod is 129, the source port is port 112-2, the destination Mod is 135 and the destination port is 118-2 (see table 402 in FIG. 4). Table 402 of FIG. 4 shows a format of a data packet transmitted within the stacking system 100. For example a data packet transmitted between CB devices. The specific example, with Source Mod 129 and Source Port 112-2 etc. shows example contents of the header when the data packet is transmitted from CB 102 to CB 106.

If the CB device 102 does not find a MAC address table entry matching MAC2, the CB device 102 may forward the Ethernet packet as an unknown unicast packet. For example, the CB device 102 forwards the Ethernet packet encapsulated with the HG header via local first-level stacking ports and local second-level stacking ports and forwards the Ethernet packet via local external port. However, the source Mod in the HG header of the packed sent via local second-level stacking ports should be recognizable for PE.

At block 305, the CB device 106 replaces the global unit ID 135 in the destination Mod field of the HG header by local unit ID 0, and transmits the Ethernet packet encapsulated with the HG header via a second-level stacking port 106-1.

The CB device 106 receives the Ethernet packet encapsulated with the HG header via a first-level stacking port, and determines that the local unit ID of the destination forwarding chip is local unit ID 0 and the destination forwarding chip is in the PE device 118 based on the global unit ID 135 of the destination Mod field.

The CB device 106 replaces the global unit ID 135 of the destination Mod field by the local unit ID 0 of the destination forwarding chip.

The CB 106 further replaces the global unit ID in the source Mod field by 0. If the global unit ID of the source Mod field is a value within [0, 63] which is recognizable by the PE device 118, the CB device 106 may not change the global unit ID of the source Mod field. Since the PE device 118 forwards data packet based on the local unit ID in the destination Mod field, whether the CB device 106 changes the local unit ID in the source Mod field does not affect the data forwarding processing of the PE device 118.

As shown by table 403 in FIG. 4, in the HG header of the data packet transmitted by the CB device 106 via the second-level stacking port 106-1, the source Mod is 0, the source port is port 112-2, the destination Mod is local unit ID 0 and the destination port is port 118-2.

When replacing the content of the destination Mod field, the CB device 106 may minus the global unit ID 135 by the parameter 135 of the PE device 118 to obtain the local unit ID 0. The parameter 135 of the PE device 118 may be calculated in a same manner as the parameter 129 of the PE device 112. The CB device may adopt other methods to replace the local unit ID in the destination Mod field. Those methods are not described herein.

At block 306, after receiving the Ethernet packet encapsulated with the HG header via the stacking port 118-2, the PE device 118 forwards the Ethernet packet based on the local unit ID 0 of the destination forwarding chip and the destination port 118-2.

Block 303 and block 304 in the above procedure have no sequence requirement.

If the CB device 102 is connected with the PE device 118 via a stacking link, the CB device 102 replaces the global unit ID 135 in the destination Mod field by the local unit ID 0, replaces the global unit ID 129 in the source Mod field by 0 and transmits the Ethernet packet via the second-level stacking port connected with the PE device 118.

If the destination port in the MAC address table entry matching MAC2 found by the CB device 102 is a local external port of the CB device 102, the CB device 102 forwards the data packet via the local external port.

If the destination Mod of the data packet received by the CB device 106 via the first-level stacking port is the global unit ID 10 or global unit ID 11 of the local forwarding chips, the Ethernet packet is forwarded by the local forwarding chips of the CB device 106 via the destination port.

The CB devices 102~106 may be chassis devices or box devices and the PE devices 112~118 may be box devices.

Based on the solution as shown in FIG. 3 and FIG. 4, the number of PE devices in the stacking system 100 may be obtained by calculating a difference between a number of forwarding chips supported by the CB devices and the total number of forwarding chips of the four CB devices and dividing the difference by a number of forwarding chips supported by the PE devices. The result is, i.e., (256−4*4)/2=(256−16)/2=120.

If the stacking system includes 10 CB devices connected in a ring or in a chain, the number of PEs may be configured in the stacking system is (256−10*4)/2=(256−40)/2=108.

On the contrary, if all of the forwarding chips of the CB devices and the PE devices are recognized by their global identifiers, the PE devices recognize the forwarding chips based on the global identifiers to forward data packets, the number of PE devices can be configured in the stacking system is reduced.

Still take the stacking system 100 as an example. The number of PE devices can be configured in the stacking system 100 may be obtained by calculating a difference between the number of forwarding chips supported by the PE devices and the total number of forwarding chips of the four CB devices and dividing the difference by a number of forwarding chips supported by the PE devices, i.e., (64−4*4)/2=(64−16)/2=24. In an exemplary stacking system consists of 10 CB devices connected in a ring or in a chain, the maximum number of PE devices is (64−10*4)/2=(64−40)/2=7.

In view of the above comparison, the access capability and forwarding capability of the stacking system as shown in FIG. 2 are improved.

The description of the above examples takes 2-layer forwarding as an example. The solution of the present disclosure is not only applicable for 2-layer forwarding but is also applicable for 3-layer forwarding. For example, the PE device 112 redirects the Ethernet packet encapsulated with the forwarding header to the CB device 102. The CB device 102 replaces the local unit ID in the source Mod field by the global unit ID, and performs 3-layer forwarding based on a destination MAC address and a virtual local area network (VLAN) ID. A routing table is searched for a next hop IP and a VLAN of the destination IP address. The CB device 102 queries an address resolution protocol (ARP) table entry based on the next hop IP address to obtain a MAC address corresponding to the next hop IP address, replaces the source MAC address by the MAC address of the CB device 102, replaces the destination MAC address by the MAC address corresponding to the next hop IP address, and replaces the VLAN by the VLAN obtained based on the routing table. The CB device 102 queries the MAC address table entry based on the replaced destination MAC address, replaces the destination Mod by the identifier of the forwarding chip in the queried MAC address table entry, and replaces the destination port by the export in the queried MAC address table entry. The CB device 102 may forward the packet to the PE device in a similar manner as the example as shown in FIG. 3 and FIG. 4. The procedure is not repeated herein.

An example of the present disclosure provides a network device for implementing the above procedure. The network device may act as a CB device in a stacking system.

Figure 5:
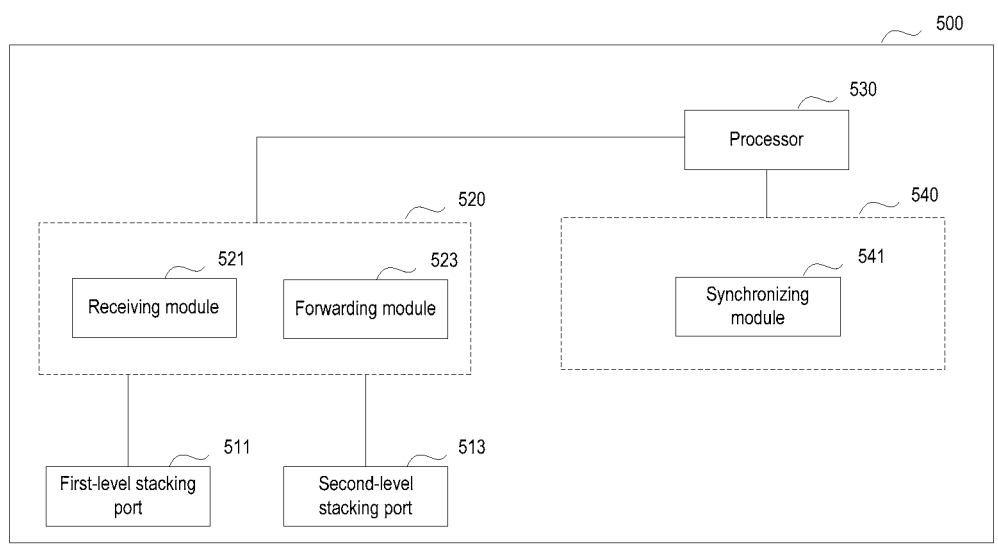
FIG. 5 is a schematic diagram illustrating a structure of a network device based on an example of the present disclosure.

As shown in FIG. 5, the network device 500 includes a first-level stacking port 511, a second-level stacking port 513, a forwarding unit 520, a processor 530 and a storage unit 540 connected with the processor 530. The forwarding unit 520 includes at least a receiving module 521 and a forwarding module 523. The storage unit 540 includes one or more program modules executable by the processor 520. The one or more program modules in the storage unit 540 include at least a synchronizing module 541.

The receiving module 521 receives a packet containing a source port number and a local identifier of a source forwarding chip via the second-level stacking port 513 connected with a source PE device. The forwarding module 523 determines a global identifier of the source forwarding chip based on an identifier of the source PE device and the local identifier of the source forwarding chip, learns a forwarding table entry based on a source address, a source port and the global identifier of the source forwarding chip of the packet, determines a destination port and a global identifier of a destination forwarding chip based on a forwarding table entry matching a destination address of the packet, determines a destination PE device and a local identifier of the destination forwarding chip based on the global identifier of the destination forwarding chip, transmits the packet via the second-level stacking port 513 connected with the destination PE device, wherein the packet contains the local identifier of the destination forwarding chip and a destination port number.

The forwarding module 523 determines, the first-level stacking port 511 for reaching another CB device to which the destination PE device connects, transmits the packet containing the source port number, the global identifier of the source forwarding chip, the destination port number and the global identifier of the destination forwarding chip via the determined first-level stacking port 511.

The receiving module 521 receives via the first-level stacking port 511 connected with another CB device a packet containing a source port number, a global identifier of a source forwarding chip, a destination port number and a global identifier of a destination forwarding chip. The forwarding module 523 determines the destination PE device and the local identifier of the destination forwarding chip based on the global identifier of the destination forwarding chip, and transmits the packet via the second-level stacking port 513 connected with the destination PE device, wherein the packet contains the source port number, the local identifier of the destination forwarding chip and the destination port number.

The receiving module 521 receives via the first-level stacking port 511 connected with another CB device a packet containing a source port number, a global identifier of a source forwarding chip, a destination port number and a global identifier of a destination forwarding chip. The forwarding module 523 determines the destination PE device and the local identifier of the destination forwarding chip based on the global identifier of the destination forwarding chip, determines, a first-level stacking port 511 for reaching another CB device to which the destination PE device connects, and transmits the packet containing the source port number, the global identifier of the source forwarding chip, the destination port number and the global identifier of the destination forwarding chip via the determined first-level stacking port 511.

The forwarding module 523 forwards, the packet containing the source port number and the global identifier of the source forwarding chip via each first-level stacking port 511, and transmits the first packet containing the source port number via each second-level stacking port 513 when there is no forwarding table entry matching the destination address.

The synchronizing module 540 transmits the learnt forwarding table entry to other CB devices for synchronization.

If the network device acts as a CB device in the stacking system, the network device 500 learns the forwarding table entry based on the global identifier of the source forwarding chip and searches for a matching forwarding table entry, replaces the global identifier of the destination forwarding chip of the packet destined to a PE device by the local identifier of the destination forwarding chip recognizable by the PE device. Thus, if the total number of global identifiers of the forwarding chips in the stacking system does not exceed the number of forwarding chips supported by the CB device, the PE device is still able to forward packets normally even if the total number of global identifiers of the forwarding chips exceeds the number of forwarding chips supported by the PE device. Thus, more PE device may be configured in the stacking system.

The above examples may be implemented by hardware, software, firmware, or a combination thereof. For example the various methods, processes and functional modules described herein may be implemented by a processor. Further, the examples disclosed herein may be implemented in the form of a software product. The computer software product is stored in a non-transitory storage medium and comprises a plurality of instructions for making a computer device (which may be a personal computer, a server or a network device, such as a router, switch, access point, etc.) implement the method recited in the examples of the present disclosure.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A method for forwarding a packet, comprising:
   receiving, by a core backbone (CB) device via a second-level stacking port connected with a source port extender (PE) device, a first packet containing a source port number and a local identifier of a source forwarding chip;
   determining a global identifier of the source forwarding chip based on the source PE and the local identifier of the source forwarding chip;
   learning a forwarding table entry based on a source address and the source port number of the first packet and the global identifier of the source forwarding chip;
   determining a destination port number and a global identifier of a destination forwarding chip based on a forwarding table entry matching a destination address of the first packet;
   determining a destination PE device and a local identifier of the destination forwarding chip based on the global identifier of the destination forwarding chip; and
   transmitting the first packet via a second-level stacking port connected with the destination PE device, wherein the first packet contains the local identifier of the destination forwarding chip and the destination port number.

2. The method of claim 1, further comprising:
   determining a first-level stacking port for reaching another CB device to which destination PE device connects; and
   transmitting, via the determined first-level stacking port, the first packet containing the source port number, the global identifier of the source forwarding chip, the destination port number and the global identifier of the destination forwarding chip.

3. The method of claim 1, further comprising:
   receiving, via a first-level stacking port connected with a neighbor CB device, a second packet containing a source port number, a global identifier of a source forwarding chip, a destination port number and a global identifier of a destination forwarding chip;
   determining a destination PE device and a local identifier of the destination forwarding chip based on the global identifier of the destination forwarding chip in the second packet; and
   transmitting, via a second-level stacking port connected with the destination PE device, the second packet containing the local identifier of the destination forwarding chip and the destination port number.

4. The method of claim 1, further comprising:
   receiving, via a first-level stacking port connected with a neighbor CB device, a third packet containing a source port number, a global identifier of a source forwarding chip, a destination port number and a global identifier of a destination forwarding chip;
   determining a destination PE device and a local identifier of the destination forwarding chip based on the global identifier of the destination forwarding chip;
   determining a first-level stacking port connected with the another CB device to which the destination PE device connects; and
   transmitting, via the determined first-level stacking port, the third packet containing the source port number, the global identifier of the source forwarding chip, the destination port number and the global identifier of the destination forwarding chip.

5. The method of claim 1, further comprising:
   when there is no forwarding table entry matching the destination address, forwarding the first packet containing the source port number and the global identifier of the source forwarding chip via each first-level stacking port and transmits the first packet containing the source port number via each second-level stacking port.

6. The method of claim 1, further comprising:
transmitting the learnt forwarding table entry to other CB devices for synchronization.

7. A core backbone (CB) device for forwarding a packet, comprising:
a receiving module, to receive via a second-level stacking port connected with a source port extender (PE) device a first packet containing a source port number and a local identifier of a source forwarding chip;
a forwarding module, to determine a global identifier of the source forwarding chip based on an identifier of the source PE device and the local identifier of the source forwarding chip; learn a forwarding table entry based on a source address and the source port number of the first packet and the global identifier of the source forwarding chip; determine a destination port number and a global identifier of a destination forwarding chip based on a forwarding table entry matching a destination address of the first packet; determine a destination PE device and a local identifier of the destination forwarding chip based on the global identifier of the destination forwarding chip; and transmit the first packet containing the local identifier of the destination forwarding chip and the destination port number via a second-level stacking port connected with the destination PE device.

8. The CB device of claim 7, wherein
the forwarding module is further to determine, a first-level stacking port for reaching another CB device to which the destination PE device connects; and transmit via the determined first-level stacking port the first packet containing the source port number, the global identifier of the source forwarding chip, the destination port number and the global identifier of the destination forwarding chip.

9. The CB device of claim 7, wherein
the receiving module is further to receive, via a first-level stacking port connected with a neighbor CB device, a second packet containing a source port number, a global identifier of a source forwarding chip, a destination port number and a global identifier of a destination forwarding chip; and
the forwarding module is further to determine a destination PE device and a local identifier of the destination forwarding chip based on the global identifier of the destination forwarding chip in the second packet; and transmit the second packet containing the source port number, the destination port number and the local identifier of the destination forwarding chip via a second-level stacking port connected with the destination PE device.

10. The CB device of claim 7, wherein
the receiving module is further to receive, via a first-level stacking port connected with a neighbor CB device, a third packet containing a source port number, a global identifier of a source forwarding chip, a destination port number and a global identifier of a destination forwarding chip; and
the forwarding module is further to determine a destination PE device and a local identifier of the destination forwarding chip based on the global identifier of the destination forwarding chip; determine, a first-level stacking port for reaching another CB device to which the destination PE device connects; and transmit the third packet containing the source port number, the global identifier of the source forwarding chip, the destination port number and the global identifier of the destination forwarding chip via the determined first-level stacking port.

11. The CB device of claim 7, wherein the forwarding module is further to transmit, the first packet containing the 25 source port number and the global identifier of the source forwarding chip via each first-level stacking port and transmits the first packet containing the source port number via each second-level stacking port when there is no forwarding table entry matching the destination address.

12. The CB device of claim 7, further comprising a synchronizing module, to transmit the learnt forwarding table entry to other CB devices for synchronization.

* * * * *